United States Patent
Sasaki et al.

(10) Patent No.: US 6,981,802 B2
(45) Date of Patent: Jan. 3, 2006

(54) CONNECTION STRUCTURE OF OPTICAL FIBER AND PROCESS FOR CONNECTING OPTICAL FIBERS

(75) Inventors: Kyoichi Sasaki, Shizuoka (JP); Ritsu Kawase, Shizuoka (JP); Masayoshi Suzuki, Shizuoka (JP); Tatsushi Kobayashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 147 days.

(21) Appl. No.: 10/287,635

(22) Filed: Nov. 5, 2002

(65) Prior Publication Data
US 2003/0091294 A1    May 15, 2003

(30) Foreign Application Priority Data

| Nov. 15, 2001 | (JP) | ............................. 2001-349610 |
| Feb. 28, 2002 | (JP) | ............................. 2002-053484 |
| Sep. 12, 2002 | (JP) | ............................. 2002-266587 |

(51) Int. Cl.
G02B 6/38 (2006.01)

(52) U.S. Cl. ............................ 385/60; 385/97; 385/98; 385/99

(58) Field of Classification Search ............ 385/95–99, 385/50–52, 65, 83, 60, 40, 9, 15, 84
See application file for complete search history.

(56) References Cited

U.S. PATENT DOCUMENTS

| 4,105,285 A | * | 8/1978 | Bedgood et al. ............... 385/63 |
| 4,964,689 A | * | 10/1990 | Wichansky ................... 385/56 |
| 4,969,705 A |   | 11/1990 | Stoy et al. |
| 4,989,946 A | * | 2/1991 | Williams et al. ............... 385/16 |
| 5,142,763 A | * | 9/1992 | Toya et al. .................... 29/517 |
| 5,241,613 A | * | 8/1993 | Li et al. ........................ 385/78 |
| 5,377,289 A |   | 12/1994 | Johnson et al. |
| 6,068,410 A | * | 5/2000 | Giebel et al. .................. 385/72 |
| 6,422,764 B1 | * | 7/2002 | Marrs ........................... 385/81 |
| 6,865,333 B2 | * | 3/2005 | Porter et al. ................. 385/139 |
| 2001/0001623 A1 | | 5/2001 | Inada et al. |

FOREIGN PATENT DOCUMENTS

| JP | 56-114914 | 9/1981 |
| JP | 11-160564 | 6/1999 |
| JP | 11-264914 | 9/1999 |

* cited by examiner

Primary Examiner—Kaveh Kianni
(74) Attorney, Agent, or Firm—McDermott Will & Emery LLP

(57) ABSTRACT

The invention provides a connection structure of optical fibers and a process for connecting optical fibers, by which the optical fibers are prevented from being damaged, the working time required for the connection is shortened, yield is improved, and efficiency of connection working is improved. The connection structure of optical fibers comprises 2 connecting members and brought face to face with each other and each having a through-hole and 2 optical fibers inserted into the respective through-holes of the connecting members. The 2 optical fibers are connected within the through-hole of one connecting member. The connection structure is formed by inserting optical fibers into respective through-holes of the 2 connecting members so as to locate an end surface of each optical fiber at an outlet of the through-hole or in the vicinity of the outlet, bringing the end surfaces of the 2 connecting members face to face with each other, and sliding the 2 connecting members in a direction of the center axis of the optical fibers to connect the optical fibers within the through-hole of one connecting member.

7 Claims, 14 Drawing Sheets

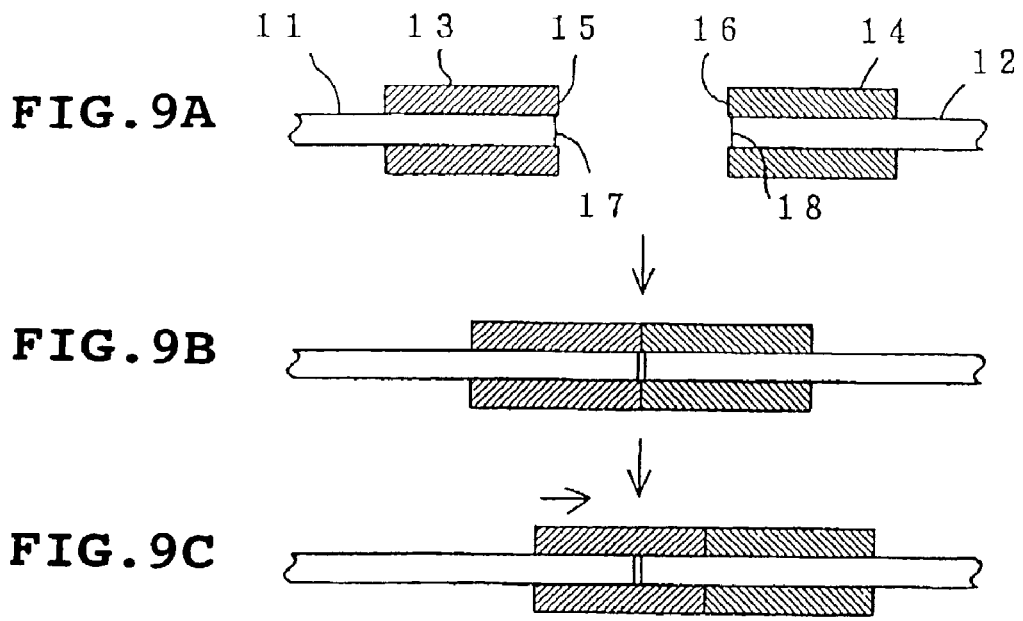
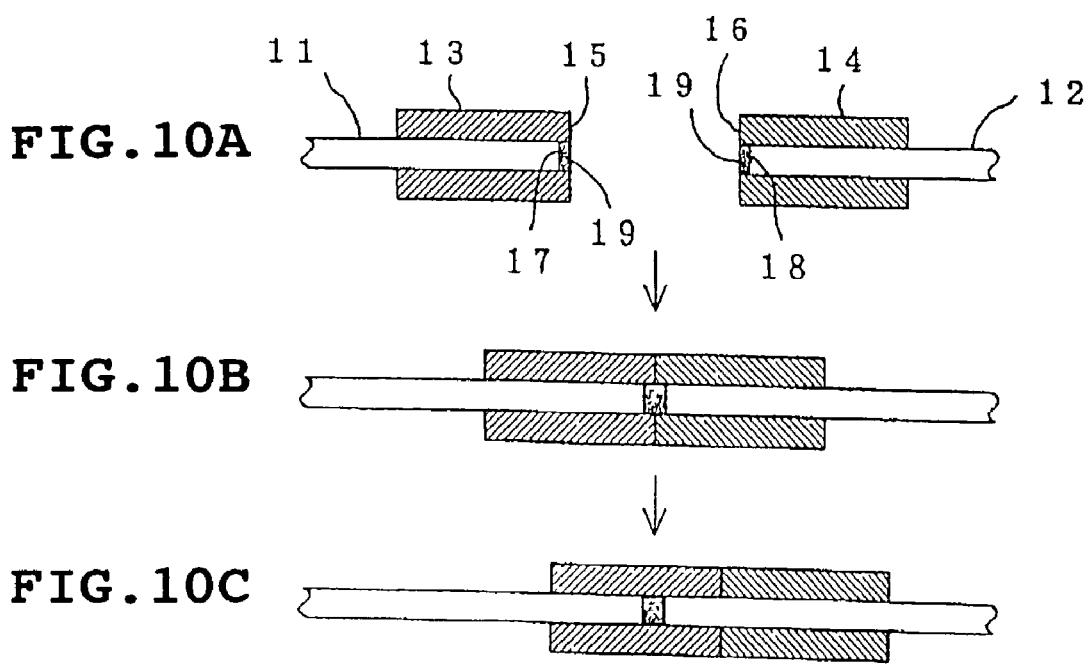

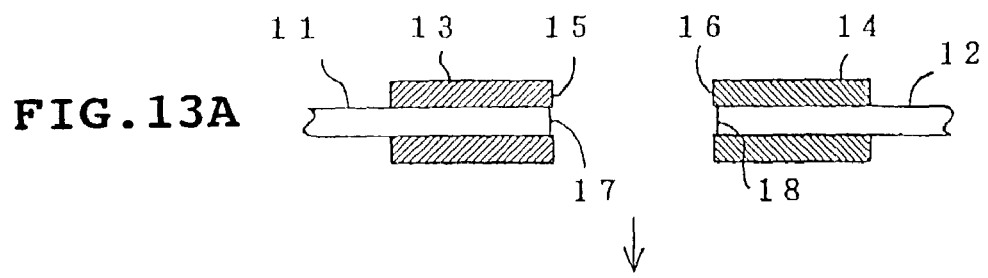
FIG.13A
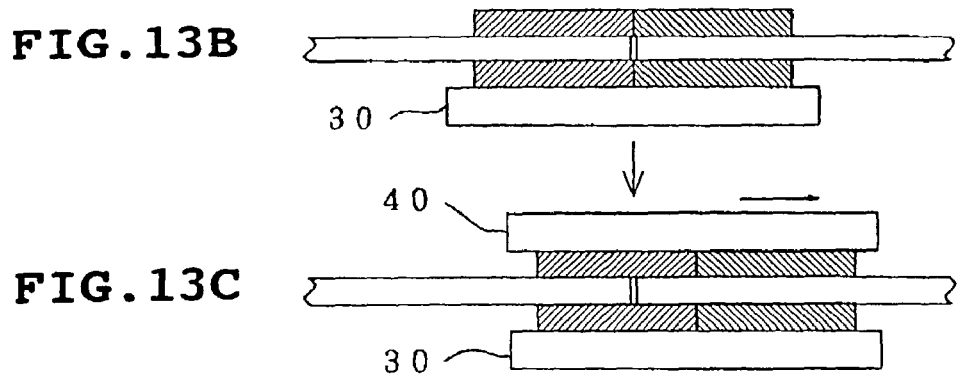
FIG.13B
FIG.13C
FIG.13D
FIG.14
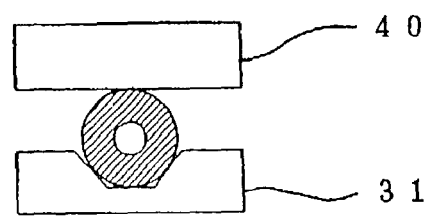
FIG.15
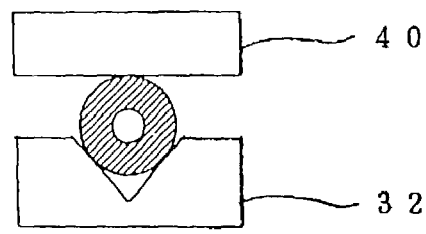

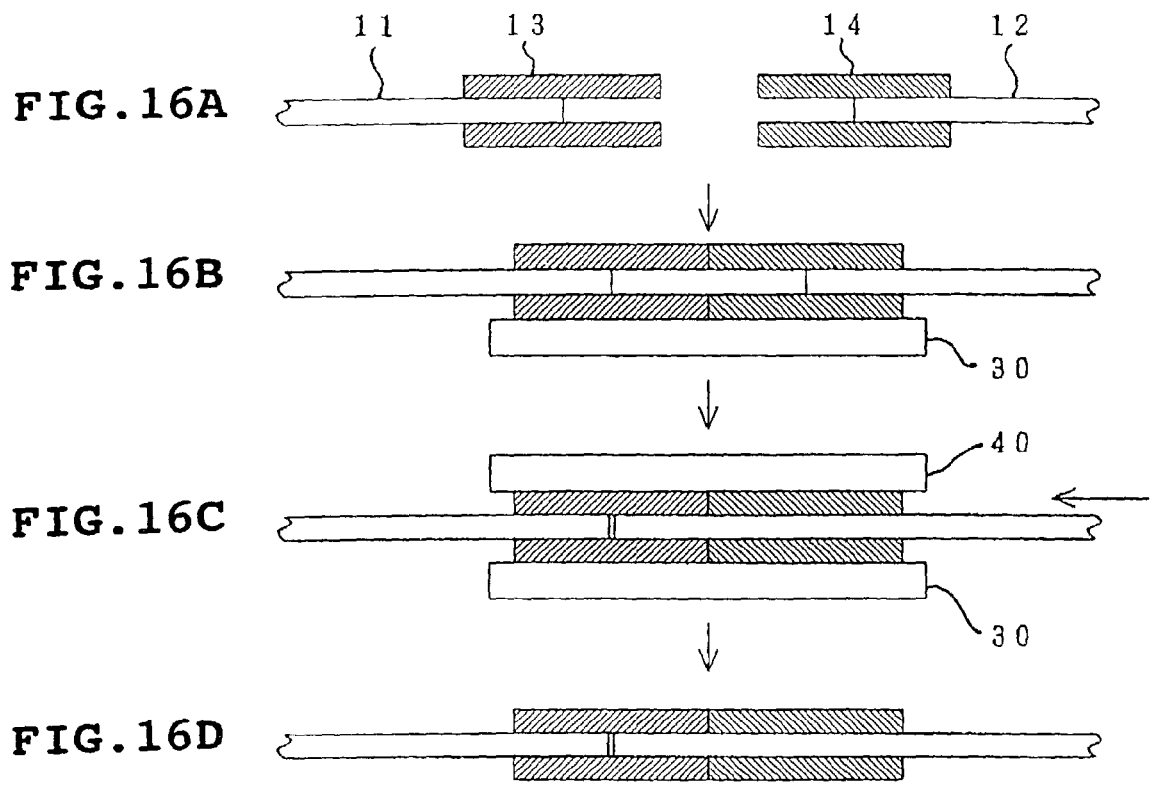
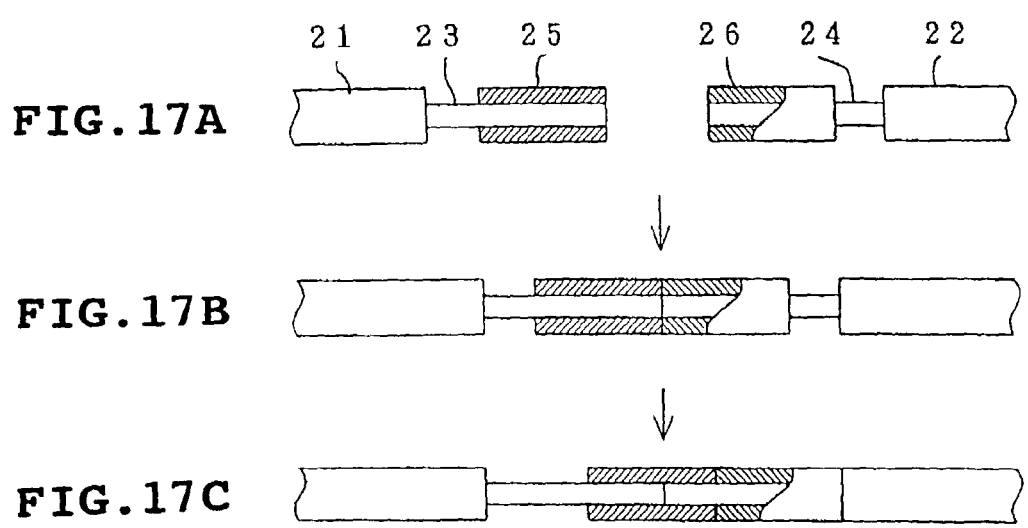

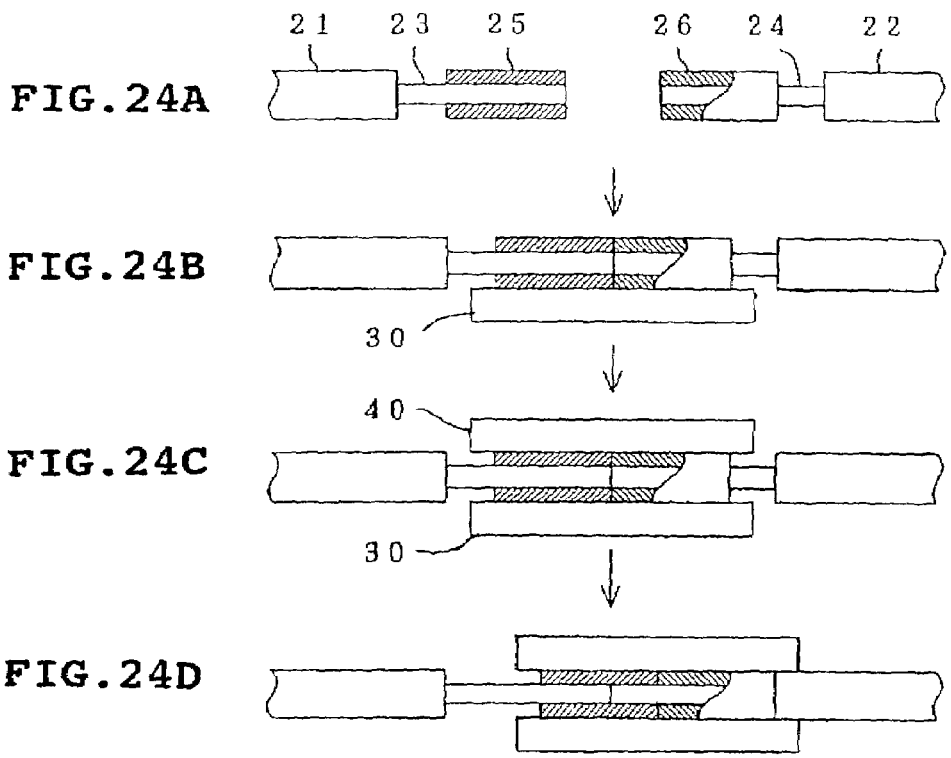
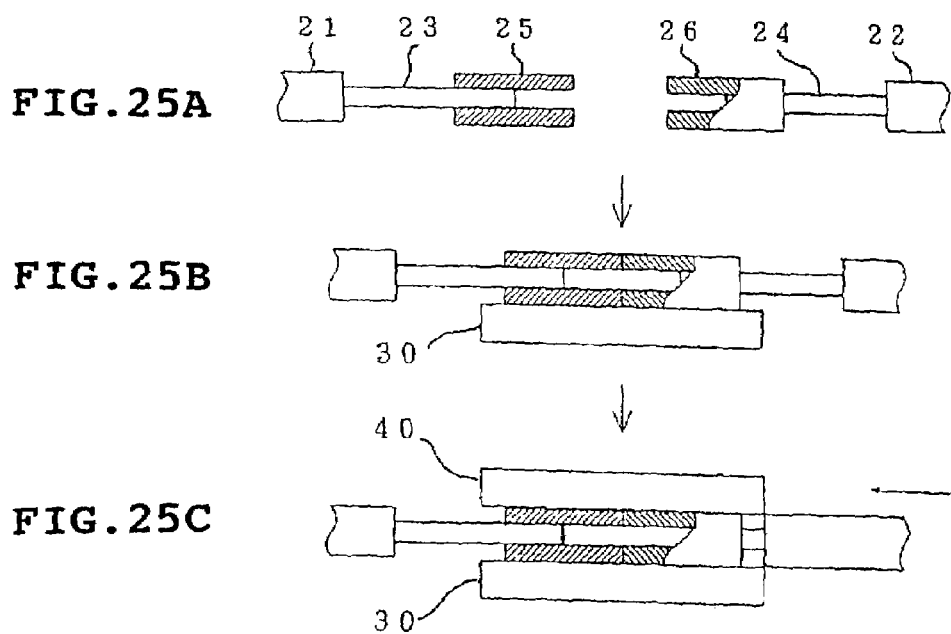

FIG.26
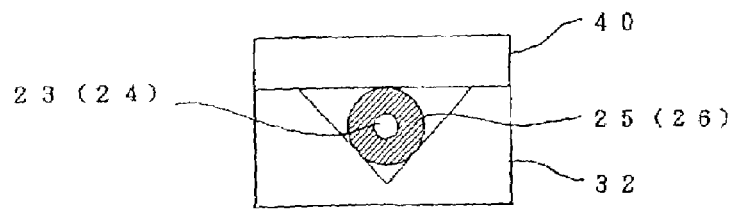
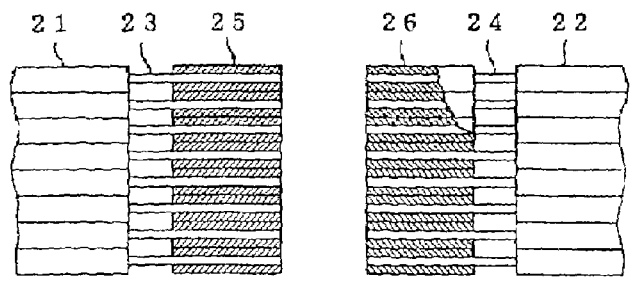
FIG.27A
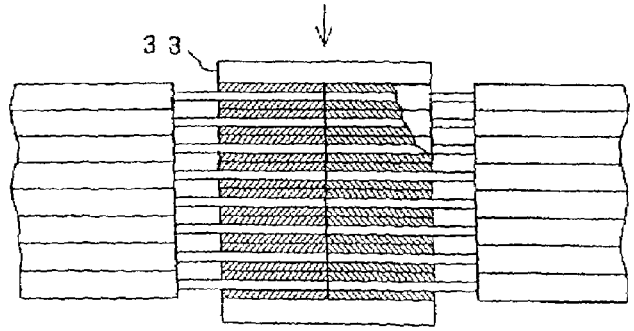
FIG.27B
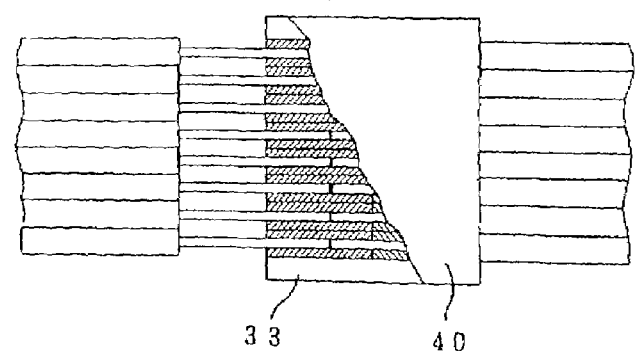
FIG.27C

FIG. 30
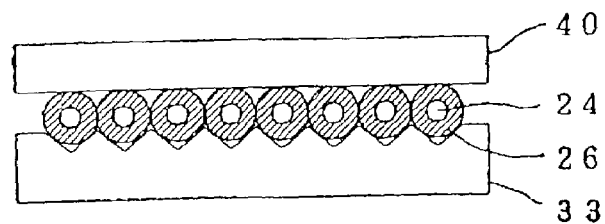
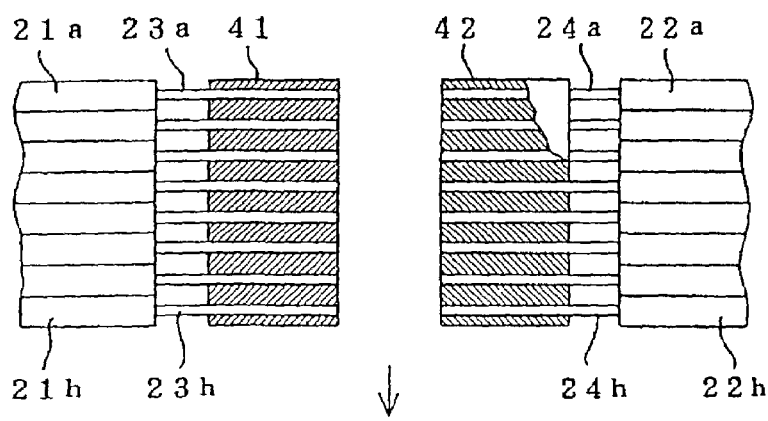
FIG. 31A
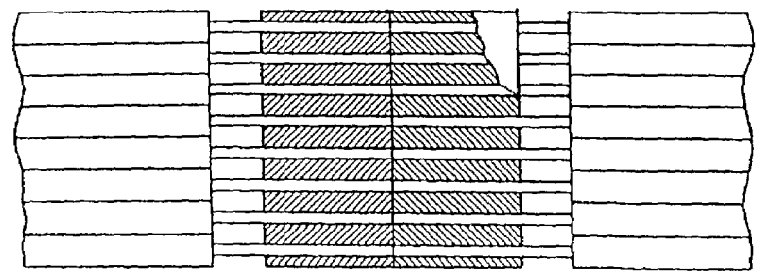
FIG. 31B
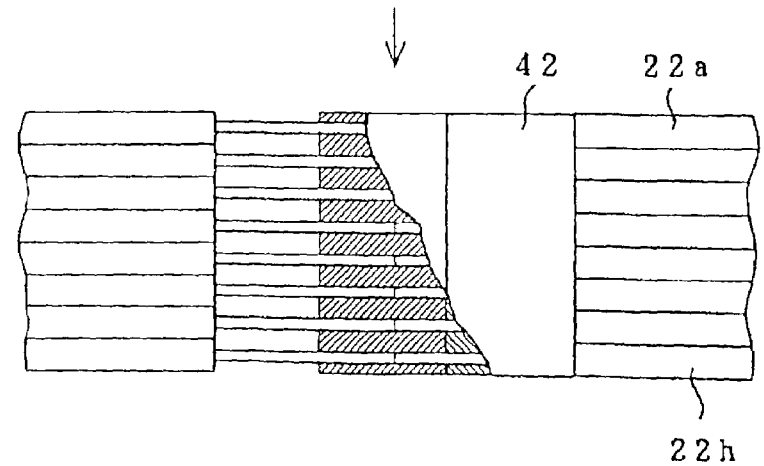
FIG. 31C

CONNECTION STRUCTURE OF OPTICAL FIBER AND PROCESS FOR CONNECTING OPTICAL FIBERS

BACKGROUND OF THE INVENTION

1. Field of the Invention

The present invention relates to a connection structure when optical fibers led out of optical elements, parts and/or devices used in optical communication and optical information processing, such as optical elements, optical circuit packages and/or optical circuit devices, are mutually connected, and a process for connecting the optical fibers.

2. Description of the Background Art

In connection of a plurality of optical elements within an optical circuit package, or optical connection making use of optical fibers between a plurality of optical circuit packages or optical circuit devices on which an optical circuit package has been mounted, an optical connector or mechanical splicer is generally installed between ends of optical fibers led out of optical elements, optical circuit packages, optical circuit devices and/or the like to connect the optical fibers, or the optical fibers are mutually connected by fusing connection.

However, the current optical connector requires PC (physical contact) connection for connecting the optical fibers. For reasons of that, it is necessary to insert the optical fibers into a ferrule made of zirconia, glass, ceramic or the like to bond them and then polishing the optical fibers, and so a process for connecting the optical fibers is considerably complicated, and it takes a long time for the polishing step.

On the other hand, the connection by the mechanical splicer in which no polishing step is required and the fusing connection requires positioning in a V-shaped groove or within a capillary in a state that claddings of the optical fibers have been exposed. In such a case, there has been a possibility that the claddings of the optical fibers may be damaged. In particular, when the optical fibers are positioned within a glass capillary as described in Japanese Patent Application Laid-Open No. 160564/1999, the claddings of the optical fibers have come into contact with the capillary, and so there is a high possibility that ends of the claddings of the optical fibers may be damaged, it has takes a long time for work, and a great influence has been exerted on yield.

The above publication and Japanese Patent Application Laid-Open No. 264914/1999 show that a slot is provided in a capillary to fill a joint between the optical fibers with an adhesive or index matching agent. In such a case, the strength of the capillary becomes very weak due to the provision of the slot, and the slot portion may be broken in some cases upon a connecting operation, which causes a problem.

SUMMARY OF THE INVENTION

The present invention has been made with a view toward solving such problems in the prior art as described above. Namely, it is an object of the present invention to provide a process for connecting optical fibers, by which in alignment between optical fibers led out of ends of optical elements, optical circuit packages, optical circuit devices and/or the like as described above, particularly, claddings of the optical fibers, from which a coating has been removed, when the optical fibers are connected to each other, certainty of the alignment upon the connection is high, working time becomes short, and workability is good by virtue of space saving, and a connection structure of optical fibers formed by such a process.

According to a first aspect of the present invention, there is thus provided a connection structure of optical fibers, comprising 2 connecting members brought face to face with each other and each having one through-hole and 2 optical fibers inserted into the respective through-holes of the connecting members, wherein the 2 optical fibers are connected within the through-hole of one connecting member.

According to a second aspect of the present invention, there is also provided a connection structure of optical fibers, comprising 2 connecting members brought face to face with each other and each having a plurality of through-holes and a plurality of optical fibers inserted into the respective through-holes of the connecting members, wherein at least a pair of the optical fibers are connected within the through-hole of one connecting member.

In these aspects of the present invention, the 2 optical fibers may be connected through an index matching agent.

According to a third of the present invention, there is further provided a multi-core connection structure of optical fibers, comprising at least two connection structures according to the first aspect provided in parallel.

Processes for connecting optical fibers according to the present invention are intended to form the connection structures described above.

According to a fourth aspect of the present invention, there is thus provided a process for connecting optical fibers, comprising the steps of inserting optical fibers into respective through-holes of 2 connecting members each having one or a plurality of through-holes so as to locate an end surface of each optical fiber at an outlet of the through-hole or in the vicinity of the outlet, bringing the end surfaces of the 2 connecting members having the respective through-holes face to face with each other, and sliding each of the 2 connecting members having the respective through-holes in a direction of the center axis of the optical fibers to connect the optical fibers within the through-hole(s) of one connecting member.

According to a fifth aspect of the present invention, there is also provided a process for connecting optical fibers, comprising the steps of inserting optical fibers into respective through-holes of 2 connecting members each having one or a plurality of through-holes so as to locate an end surface of each optical fiber within the interior of the through-hole, bringing the end surfaces of the 2 connecting members with the optical fibers inserted into the respective through-holes face to face with each other, and forcedly pushing the optical fibers inserted into one or both connecting members to connect the optical fibers within the through-hole(s) of one connecting member.

According to a sixth aspect of the present invention, there is further provided a process for connecting optical fibers, comprising the steps of inserting optical fibers into respective through-holes of 2 connecting members each having one or a plurality of through-holes so as to draw the optical fiber(s) out of the through-hole(s) in one connecting member and retain the optical fiber(s) within the through-hole(s) in the other connecting member, and bringing the end surfaces of the 2 connecting members having the respective through-holes face to face with each other to connect the optical fibers within the through-hole(s) of one connecting member.

When the 2 connecting members each having one through-hole are used in the process according to the fourth aspect of the present invention, it may be preferable to use an aligning member when the connecting members are brought face to face with each other and to use a fixing member when the connecting members brought face to face with each other are slid. Namely, according to a specific preferred embodiment of the present invention, there is provided a process for connecting optical fibers, comprising the steps of inserting optical fibers into respective through-holes of a pair of connecting members composed of 2 connecting members each having one through-hole or a plurality of pairs of the connecting members so as to locate an end surface of each optical fiber at an outlet of the through-hole or in the vicinity of the outlet, placing a pair or a plurality of pairs of the connecting members with the optical fibers inserted into the respective through-holes on an aligning member so as to bring the end surfaces of each pair of the 2 connecting members face to face with each other, holding and fixing a pair or a plurality of pairs of the connecting members brought face to face with each other by the aligning member and a fixing member, and then sliding the aligning member and the fixing member in a direction of the center axis of the optical fibers to connect the optical fibers within the through-hole(s) of one connecting member(s).

When the 2 connecting members each having one through-hole are used in the process according to the fifth aspect of the present invention, it may be preferable to use an aligning member when the connecting members are brought face to face with each other and to use a fixing member when the optical fibers are forcedly pushed. Namely, according to another specific preferred embodiment of the present invention, there is also provided a process for connecting optical fibers, comprising the steps of inserting optical fibers into respective through-holes of a pair of connecting members composed of 2 connecting members each having one through-hole or a plurality of pairs of the connecting members so as to locate an end surface of each optical fiber within the interior of the through-hole, placing a pair or a plurality of pairs of the connecting members with the optical fibers inserted into the respective through-holes on an aligning member so as to bring the end surfaces of each pair of the 2 connecting members face to face with each other, holding and fixing a pair or a plurality of pairs of the connecting members brought face to face with each other by the aligning member and a fixing member, and then forcedly pushing the optical fibers inserted into one or both connecting members to connect the optical fibers within the through-hole(s) of one connecting member(s).

In these processes, the aligning member may preferably have at least one groove, for example, a groove having a V-shaped cross-section. An index matching agent may be preferably applied to the end surface of the optical fibers to connect the optical fibers.

BRIEF DESCRIPTION OF THE DRAWING

FIGS. 9A to 9C are flow charts illustrating an exemplary process for connecting optical fibers according to an embodiment of the present invention.

FIGS. 10A to 10C are flow charts illustrating another exemplary process for connecting optical fibers according to the embodiment of the present invention.

FIGS. 13A to 13D are flow charts illustrating a case where optical fibers are connected by using an aligning member in the present invention.

FIG. 14 is a transverse cross-sectional view illustrating a state that connecting members have been fixed.

FIG. 15 is a transverse cross-sectional view illustrating a state that connecting members have been fixed.

FIGS. 16A to 16D are flow charts illustrating an exemplary process for connecting optical fibers according to a still further embodiment of the present invention.

FIGS. 17A to 17C are flow charts illustrating a process for connecting optical fibers according to Example 1.

FIGS. 24A to 24D are flow charts illustrating a process for connecting optical fibers according to Example 8.

FIGS. 25A to 25C are flow charts illustrating a process for connecting optical fibers according to Example 9.

FIG. 26 is a cross-sectional view illustrating a state that connecting members have been fixed in Example 10.

FIGS. 27A to 27C are flow charts illustrating a process for batch-connecting optical fibers according to Example 11.

FIG. 30 is a cross-sectional view illustrating a state that connecting members have been fixed in Example 12.

FIGS. 31A to 31C are flow charts illustrating a process for connecting optical fibers according to Example 14.

Figure 1:
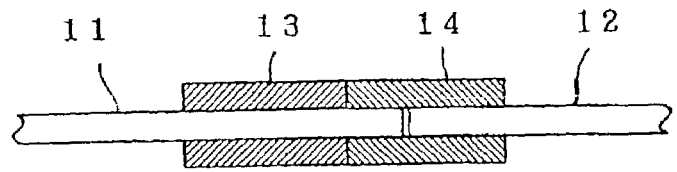
FIG. 1 is a longitudinal cross-sectional view of an exemplary connection structure of optical fibers according to the present invention.

In the drawings, meanings of reference characters are as follows: 11, 11a to 11d, 12, and 12a to 12d . . . optical fiber, 13, 13a to 13d, 14, and 14a to 14d . . . connecting member having one through-hole, 13' and 14' . . . connecting member having a plurality of through-holes, 15 and 16 . . . outlet end surface of through-hole, 17 and 18 . . . end surface of optical fiber, 19 . . . index matching agent, 21, 21*a* to 21*h*, 22, and 22*a* to 22*h* . . . optical fiber, 23, 23*a* to 23*h*, 24, and 24*a* to 24*h* . . . cladding of optical fiber, 25 and 26 . . . microcapillary, 27 and 28 . . . metallic capillary, 30 to 33 . . . aligning member, 40 . . . fixing member, 41 and 42 . . . block for connection.

DETAILED DESCRIPTION OF THE INVENTION

The embodiments of the present invention will hereinafter be described with reference to the accompanying drawings. The connection structures of optical fibers according to the present invention will be first described.

Figure 2:
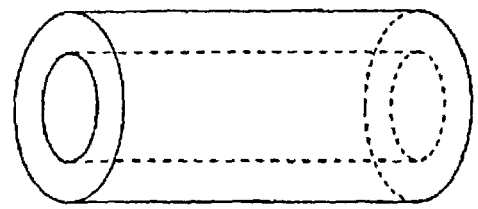
FIG. 2 is a perspective view of an exemplary connecting member used in the present invention.
Figure 3:
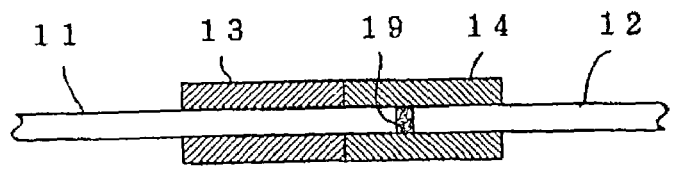
FIG. 3 is a longitudinal cross-sectional view of another exemplary connection structure of optical fibers according to the present invention.
Figure 4:
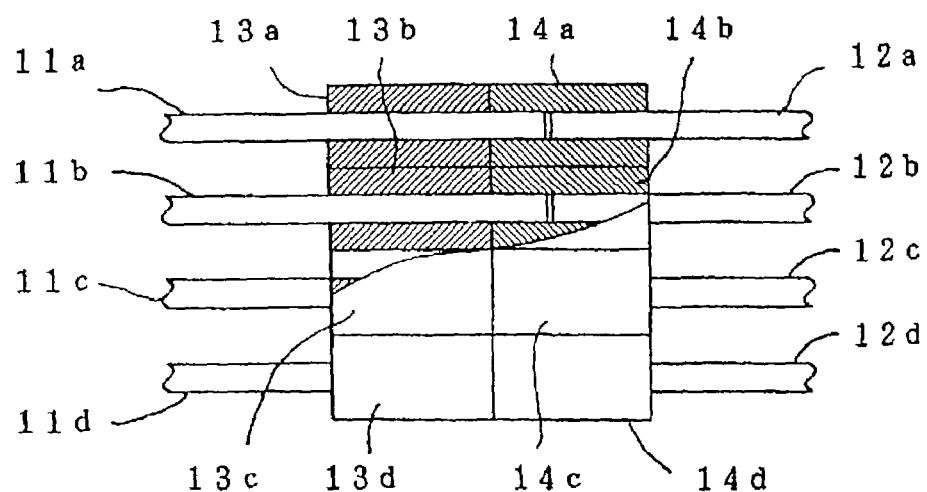
FIG. 4 is a partially broken plan view of an exemplary multi-core connection structure of optical fibers according to the present invention.

FIGS. 1 to 4 illustrate the connection structures of optical fibers according to the present invention when connecting members each having one through-hole are used. FIG. 1 is a longitudinal cross-sectional view of an example thereof. Two optical fibers 11 and 12 are inserted into through-holes of connecting members 13 and 14, respectively, and the 2 optical fibers 11 and 12 are connected within the through-hole of one connecting member 14. FIG. 2 is a perspective view of an example of the connecting member having one through-hole used in the present invention. FIG. 3 is a longitudinal cross-sectional view of another example of the connection structure of optical fibers according to the present invention. Although the connection structure is the same as in FIG. 1, FIG. 3 illustrates a case where the 2 optical fibers 11 and 12 are connected through an index matching agent 19. FIG. 4 is a partially broken plan view of an example of the multi-core connection structure of optical fibers according to the present invention. In the case of this drawing, a connection structure of four optical fibers is formed by bonding 4 connection structures according to the present invention as shown in FIG. 1 to one another.

Figure 5:
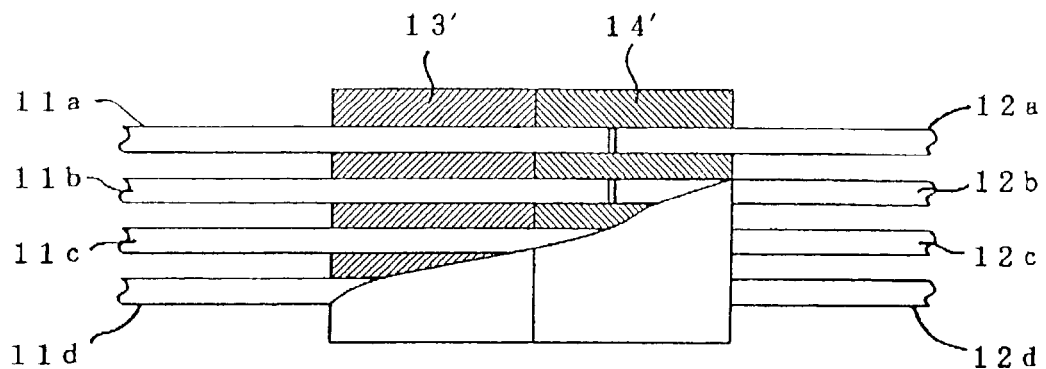
FIG. 5 is a partially broken plan view of a further exemplary connection structure of optical fibers according to the present invention.
Figure 6:
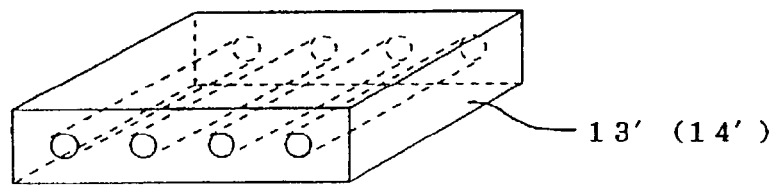
FIG. 6 is a perspective view of another exemplary connecting member used in the present invention.

FIGS. 5 to 8 illustrate the connection structures of optical fibers according to the present invention when connecting members each having a plurality of through-holes are used. FIG. 5 is a partially broken plan view of an example thereof. A plurality of pairs (11*a* and 12*a* to 11*d* and 12*d*) of 2 optical fibers are inserted into a plurality of through-holes (4 holes in FIG. 5) of connecting members 13' and 14', respectively, and the optical fibers 11*a* to 11*d* and the optical fibers 12*a* to 12*d* are respectively connected within the through-holes of one connecting member 14'. FIG. 6 is a perspective view of an example of the connecting member having a plurality of through-holes used in the present invention. Although the number of through-holes provided in the connecting member is 4 in FIG. 6, no particular limitation is imposed on the number of the through-holes. In the present invention, 2 or more through-holes may be provided.

Figure 7:
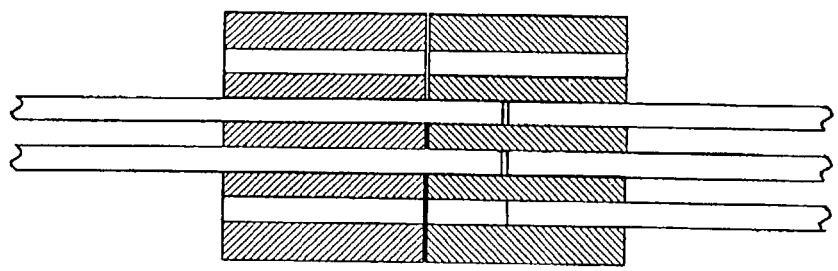
FIG. 7 illustrates a still further exemplary connection structure of optical fibers according to the present invention.
Figure 8:
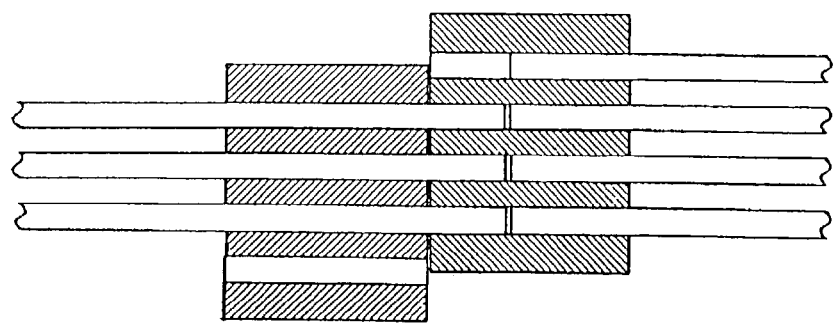
FIG. 8 illustrates a yet still further exemplary connection structure of optical fibers according to the present invention.

FIGS. 7 and 8 illustrates other examples of the connection structure of optical fibers according to the present invention and show cases where a part of a plurality of the through-holes are not used in the connection of optical fibers. More specifically, FIG. 7 shows a case where no optical fiber is inserted into a part of a plurality of the through-holes, while FIG. 8 shows a case where the connecting members are brought face to face with each other in a form deviated from each other.

In the present invention, the optical fibers connected are not particularly limited and suitably chosen for use as necessary for the end application intended for optical connection. For example, single mode optical fibers or multi-mode optical fibers made of quartz or a plastic are preferably used.

The connecting members having one or a plurality of through-holes used in the present invention may be the same or different from each other in material and structure and are suitably chosen for use as necessary for the end application intended according to the kind of the optical fibers used, an installation environment and an installation method. As the connecting member having one through-hole, is preferably used a capillary, for example, a glass capillary, plastic capillary, metallic capillary or ceramic capillary. The hole form of the through-hole provided in the connecting member is suitably selected according to the form of the optical fibers used. For example, cylindrical through-holes are preferably used when cylindrical optical fibers are connected to each other. These through-holes are preferably greatest in the internal diameter thereof at the end surfaces of the through-holes and smallest in the vicinity of the center thereof. For example, those beveled or shaped in a conical form at the end surfaces thereof are preferably used. The external form of the connecting members may be in any form according to the form of a structure body for fixing the connecting members and an alignment method of the optical fibers. In the case of the connecting members having one through-hole, however, those having a cylindrical form are generally preferably used. In the case of the connecting members having a plurality of through-holes, those having a rectangular form are preferably used. No particular limitation is imposed on the method for inserting the optical fibers into the respective through-holes in the present invention, and already known methods may be suitably used.

In the present invention, the optical fibers may be connected to each other through an index matching agent. As the index matching agent, any material may be suitably chosen for use according to the refractive indexes of the optical fibers used. For example, silicone oil, silicone grease or the like is preferably used.

The connection structures for optical fibers according to the present invention may be fixed for the purpose of retaining the connected state of the optical fibers connected. No particular limitation is imposed on the fixing material and fixing method so far as strength capable of retaining the connected state can be achieved, and any material and method may be suitably chosen for use as necessary for the end application intended. The site of the connection structure may be fixed, for example, by bonding with a resin material or mechanically. As an adhesive for the fixing, any adhesive may be used so far as no stress-strain is applied to the optical fibers by adhesion. Examples of adhesives usable include various kinds of pressure-sensitive adhesives such as urethane, acrylic, epoxy, nylon, phenol, polyimide, vinyl, silicone, rubber, fluorinated epoxy and fluorinated acrylic adhesives, thermoplastic adhesives, thermosetting adhesives, and ultraviolet (UV) curable adhesives. The UV curable adhesives and thermoplastic adhesives are preferably used from the viewpoint of ease of working.

In the present invention, when a connection structure of multi-optical fibers is formed by using the connecting members having one through-hole and bonding 2 or more connection structures of multi-optical fibers to each other, those conventionally used may be used as fixing and aligning members and jigs therefor without any particular limitation. When the optical fibers are connected and fixed to these members, it is only necessary to bond and fix the connection structures by the above-described fixing material. Even when the connecting member is fixed to another structure, any conventionally known methods may be suitably used to fix the connecting member either mechanically or by using the fixing material.

The connecting processes of optical fibers according to the present invention for obtaining the above-described connection structures will now be described. Although connecting processes in the case where the connecting members having one through-hole are used are described with reference to FIGS. 9A to 12B, the optical fibers may be connected according to the same processes even when the connecting members having a plurality of through-holes are used. Therefore, the description thereof is omitted.

FIGS. 9A to 9C illustrate an example of the process for connecting optical fibers according to the fourth aspect of the present invention. As illustrated in FIG. 9A, optical fibers 11 and 12 are first inserted into respective through-holes of connecting members 13 and 14 having a through-hole so as to locate an end surface of each optical fiber in the vicinity of an outlet of the through-hole. As illustrated in FIG. 9B, the connecting members 13 and 14 having the through-hole, into which the optical fiber has been inserted, are then brought face to face with each other so as to face outlet end surfaces 15 and 16 of the respective through-holes each other. As illustrated in FIG. 9C, one member 13 having the through-hole is then slid in a direction (direction of an arrow in FIG. 9C) of the center axis of the optical fiber, thereby forming a connection structure with end surfaces 17 and 18 of the 2 optical fibers connected within the through-hole of the connecting member 13. In FIG. 9C, the connecting member 13 is slid in the right direction. When the connecting member 14 is slid in the left direction, however, a connection structure with the 2 optical fibers connected within the through-hole of the connecting member 14 can be formed.

In the case as described above, the outlet end surfaces 15 and 16 of the respective through-holes of the connecting members are brought face to face with each other. Since the optical fibers 11 and 12 inserted into the respective through-holes are protected by the connecting members 13 and 14, the optical fibers 11 and 12 are not damaged even when the connection structure comes into contact with any other structure.

When the optical fibers are connected in the above described manner, passive alignment such as a method in which an aligning member, which will be described subsequently, is used, a method in which the connecting members are installed on a groove structure such as a V-shaped groove, or a method in which the connecting members having a through-hole according to the present invention are inserted into other connecting members having a through-hole is preferably used as the alignment of the connecting members having the through-hole. Besides, publicly known alignment methods such as active alignment may also be used.

FIGS. 10A to 10C illustrate another example of the process for connecting optical fibers according to the fourth aspect of the present invention. As illustrated in FIG. 10A, optical fibers 11 and 12 are inserted into respective through-holes of connecting members 13 and 14 having a through-hole so as to locate an end surface of each optical fiber in the vicinity of an outlet of the through-hole. In order to more improve a connected state between the optical fibers, an index matching agent 19 is then applied to end surfaces 17 and 18 of the optical fibers. As illustrated in FIG. 10B, the connecting members 13 and 14 having the through-hole, into which the optical fiber has been inserted, are then brought face to face with each other so as to face outlet end surfaces 15 and 16 of the respective through-holes each other. As illustrated in FIG. 10C, the member 13 having the through-hole is then slid in a direction of the center axis of the optical fiber to connect the 2 optical fibers, thereby forming a connection structure of the optical fibers according to the present invention. In this case, a UV curable adhesive, thermosetting adhesive or the like may be used as the index matching agent to bond and retain the joint between the end surfaces of the optical fibers.

As a method for applying the index matching agent to the end surfaces of the optical fibers, the index matching agent may be coated on the ends of the respective connecting members having the through-hole in advance to apply the index matching agent to the end surfaces of the optical fibers upon the insertion of the optical fibers, thereby charging the index matching agent between the optical fibers within the through-hole.

Figure 11A:
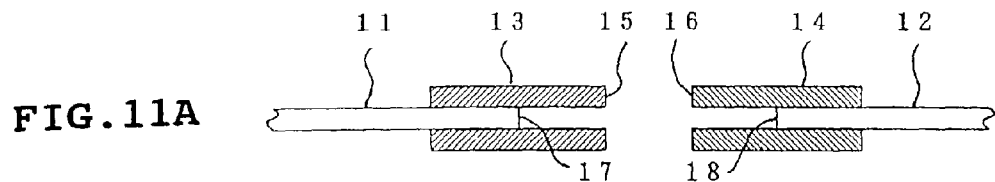
FIGS. 11A to 11C are flow charts illustrating an exemplary process for connecting optical fibers according to another embodiment of the present invention.
Figure 11B:
Figure 11C:
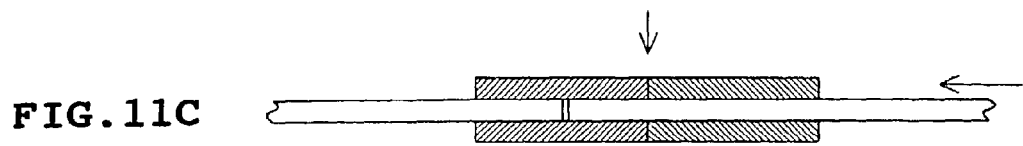

FIGS. 11A to 11C illustrate an example of the process for connecting optical fibers according to the fifth aspect of the present invention. As illustrated in FIG. 11A, optical fibers 11 and 12 are inserted into respective through-holes of connecting members 13 and 14 having a through-hole so as to locate an end surface of each optical fiber in the interior of the through-hole. As illustrated in FIG. 11B, the connecting members 13 and 14 having the through-hole, into which the optical fiber has been inserted, are then brought face to face with each other so as to face outlet end surfaces 15 and 16 of the respective through-holes each other. As illustrated in FIG. 11C, one or both optical fibers (the optical fiber 12 in FIG. 11C) are then forcedly pushed, whereby end surfaces 17 and 18 of the 2 optical fibers are connected within the through-hole of the connecting member 13 to form a connection structure of the optical fibers. Incidentally, the optical fiber 12 is forcedly pushed in FIG. 11C. However, the optical fiber 11 may be forcedly pushed, thereby forming a connection structure with the 2 optical fibers connected within the through-hole of the connecting member 14. When the end surface of each optical fiber is located at a position close to the insertion end of the through-hole, both optical fibers may be forcedly pushed and connected within the through-hole of one connecting member.

Figure 12A:
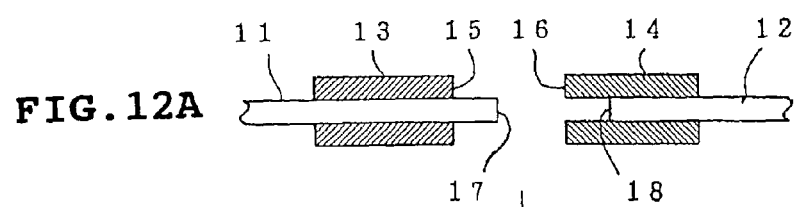
FIGS. 12A and 12B are flow charts illustrating an exemplary process for connecting optical fibers according to a further embodiment of the present invention.
Figure 12B:
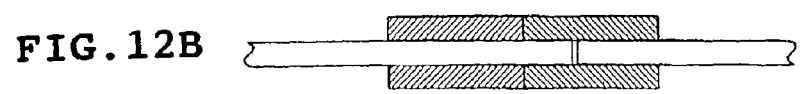

FIGS. 12A and 12B illustrate an example of the process for connecting optical fibers according to the sixth aspect of the present invention. As illustrated in FIG. 12A, optical fibers 11 and 12 are inserted into respective through-holes of connecting members 13 and 14 having a through-hole so as to draw the optical fiber 11 out of the through-hole of the connecting member 13 having the through-hole and retain the optical fiber 12 within the through-hole of the connecting member 14 having the through-hole. As illustrated in FIG. 12B, the connecting members 13 and 14 having the through-hole, into which the optical fiber has been inserted, are then brought face to face with each other so as to face outlet end surfaces 15 and 16 of the respective through-holes each other, whereby end surfaces 17 and 18 of the 2 optical fibers are connected within the through-hole of the connecting member 14 having the through-hole to form a connection structure of the optical fibers. Incidentally, in contrast with the above, it is also permissible that the optical fiber 11 inserted into the connecting members 13 is retained within the through-hole of the connecting member 13, and the optical fiber 12 inserted into the connecting members 14 is drawn out of the through-hole of the connecting member 14, thereby connecting the optical fibers as described above.

FIGS. 13A to 16D illustrate cases where optical fibers are connected by using an aligning member and a fixing member.

In FIGS. 13A to 13D, optical fibers 11 and 12 are first inserted into respective through-holes of a pair of connecting members 13 and 14 having a through-hole so as to locate an end surface of each optical fiber in the vicinity of an outlet of the through-hole in the same manner as in FIG. 9A (FIG. 13A). As illustrated in FIG. 13B, a pair of the connecting members 13 and 14 having the through-hole, into which the optical fiber has been inserted, are brought face to face with each other on a flat aligning member 30 so as to face outlet end surfaces 15 and 16 of the respective through-holes each other. A flat fixing member 40 is then placed on the connecting members 13 and 14 to hold and fix the connecting members 13 and 14 by the aligning member 30 and the fixing member 40. The aligning member 30 and the fixing member 40 are then slid together with the connecting members 13 and 14 in a direction (direction of an arrow in FIG. 13C) of the center axis of the optical fiber (FIG. 13C), thereby forming a connection structure with end surfaces 17 and 18 of the 2 optical fibers connected within the through-hole of the connecting member 13. In FIG. 13C, the connecting member 13 is slid in the right direction. When the connecting member 14 is slid in the left direction, however, a connection structure with the 2 optical fibers connected within the through-hole of the connecting member 14 can be formed.

After the connection is conducted as described above, the aligning member 30 and the fixing member 40 are removed, thereby forming a connection structure illustrated in FIG. 13D. In this case, since a space required upon the connection may be an extent that the aligning member and fixing member may be slid, space saving upon working can be achieved. Incidentally, the connection structure may be used in a state that the connecting members have been fixed (the state illustrated in FIG. 13C) without removing the aligning member 30 and the fixing member 40.

FIG. 14 is a cross-sectional view illustrating a case where an aligning member 31 having a groove is used in place of the aligning member 30 in FIGS. 13A to 13D and shows a state that the connecting members 13 and 14, into which the optical fiber was inserted, have been arranged within the groove in the aligning member 31 and fixed by the fixing member 40. FIG. 15 is a cross-sectional view illustrating a case where an aligning member 32 having a V-shaped groove is used and shows a state that the connecting members 13 and 14, into which the optical fiber was inserted, have been arranged within the V-shaped groove in the aligning member 32 and fixed by the fixing member 40.

In FIGS. 16A to 16D, optical fibers 11 and 12 are inserted into respective through-holes of a pair of connecting members 13 and 14 having a through-hole so as to locate an end surface of each optical fiber in the interior of the through-hole in the same manner as in FIG. 11A (FIG. 16A). As illustrated in FIG. 16B, a pair of the connecting members 13 and 14 having the through-hole, into which the optical fiber has been inserted, are brought face to face with each other on a flat aligning member 30 so as to face outlet end surfaces 15 and 16 of the respective through-holes each other. A flat fixing member 40 is then placed on the connecting members 13 and 14 to hold and fix the connecting members 13 and 14 by the aligning member 30 and the fixing member 40. One or both optical fibers (the optical fiber 12 in FIG. 16C) are then forcedly pushed, thereby forming a connection structure with end surfaces 17 and 18 of the 2 optical fibers connected within the through-hole of the connecting member 13 as illustrated in FIG. 16C. Incidentally, the optical fiber 12 is forcedly pushed in FIG. 16C. However, the optical fiber 11 may be forcedly pushed, thereby forming a connection structure with the 2 optical fibers connected within the through-hole of the connecting member 14.

After the connection is conducted as described above, the aligning member 30 and the fixing member 40 are removed, thereby forming a connection structure illustrated in FIG. 16D. In this case, the 2 optical fibers respectively inserted into the 2 through-holes may be regarded as 2 optical fibers as if they were inserted from both ends of one through-hole, and so damage at ends of the optical fibers is prevented. Incidentally, the connection structure may be used in a state that the connecting members have been fixed (the state illustrated in FIG. 16C) without removing the aligning member 30 and the fixing member 40.

In the present invention, as a material for the aligning member, it may be preferably used that is capable of aligning the connecting members having the through-hole without deforming them, such as a metal, plastic, glass or ceramic. When the aligning member having a groove is used, a plurality of grooves may exist. The form of the groove is preferably linear because the connecting members having the through-hole are linearly aligned in the direction of the center axis of the optical fiber. The sectional form of the groove is preferably V-shaped because the connecting members having the through-hole can be aligned with good precision.

The fixing member may be in any form so far as the connecting member can be surely fixed by holding them with the aligning member. However, a flat member capable of averaging the pressing force applied to the connecting members is generally preferred. A material thereof may be suitably selected from ceramics, glass, metals, plastics and rubbery materials according to the connecting members having the through-hole. Among these, rubbery materials are more preferably used. Hybrid materials of glass, plastic, ceramic or the like making use of a rubbery material at only portions coming into contact with the connecting members having the through-hole may also be preferably used.

The end surfaces of the connecting members may come into contact with each other, or may be spaced from each other so far as the alignment of the connecting members can be performed when the members having the through-hole are brought face to face with each other as described above. If a space is present, an optical fiber inserted into the through-hole can be surely inserted into the through-hole of another connecting member with ease without damaging the optical fiber so far as the connecting members 13 and 14 having the through-hole have been already aligned. In order to conduct the connection of the optical fibers with better results, it is preferred that the end surfaces of the connecting members be brought face to face with each other as described above, and one or both of the optical fibers be then forcedly pushed, thereby bringing the end surfaces of the connecting members into contact with each other.

Since the connection structures of optical fibers according to the present invention and the processes for connecting optical fibers, which are forming processes therefor, have the constitution described above, in alignment between optical fibers led out of ends of optical elements, optical circuit packages, optical circuit devices and/or the like, particularly, claddings of the optical fibers, from which a coating has been removed, when the optical fibers are connected to each other, the optical fibers are prevented from being damaged, and there is no need of polishing the optical fibers. Accordingly, effects that the working time required for the connection is shortened, yield is improved, and efficiency of connection working is improved are brought about. A connection structure of multi-optical fibers can be formed with ease by uniting a number of the connection structures according to the present invention.

EXAMPLES

The present invention will hereafter be described in detail by the following example. However, the present invention is not limited to this example.

Example 1

The connection of optical fibers was performed in such a manner as illustrated in FIGS. 17A to 17C. More specifically, coatings of optical fiber 21 and 22 (products of The Furukawa Electric Co., Ltd.; diameter: 250 μm) were removed by 20 mm from their ends to expose a cladding (diameter: 125 μm) of each optical fiber. The claddings and cores of the optical fibers were cut at a portion 5 mm away from the end to adjust the length of the claddings 23 and 24 to 15 mm. Thereafter, the claddings of the optical fibers were inserted into respective microcapillaries 25 and 26 (products of Nippon Electric Glass Co., Ltd.; outer diameter: 0.25 mm; inner diameter: 0.126 mm; length: 10 mm) formed of boro-silicate glass from one ends thereof, and the end surfaces of the optical fiber claddings were aligned in the vicinity of the other ends of the microcapillaries. Two microcapillaries, into which the optical fiber had been inserted in such a manner, were provided (FIG. 17A). End surfaces of these microcapillaries 25 and 26 were then brought face to face with each other (FIG. 17B). Thereafter, one microcapillary 25 was slid in the right direction along the center axis of the optical fiber until the other microcapillary 26 came into contact with the coating of the optical fiber 22, thereby forming a connection structure of optical fibers according to the present invention (FIG. 17C).

In the thus-obtained connection structure of the optical fibers, the optical fibers were prevented from being damaged because the optical fiber claddings easy to be damaged upon connection of the optical fibers were inserted into the respective microcapillaries, and the connection between the optical fibers was feasible with ease.

Thereafter, a connection loss was measured at the junction point of the optical fibers and found to be at most 0.7 dB. The connection structure was thus sufficiently usable as an optical connection structure.

Example 2

Figure 18A:
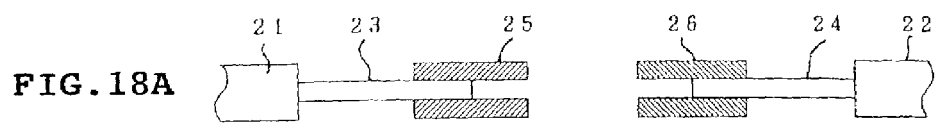
FIGS. 18A to 18C are flow charts illustrating a process for connecting optical fibers according to Example 2.
Figure 18B:
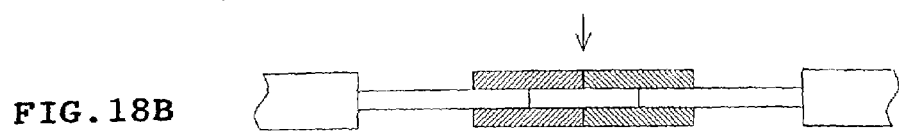
Figure 18C:
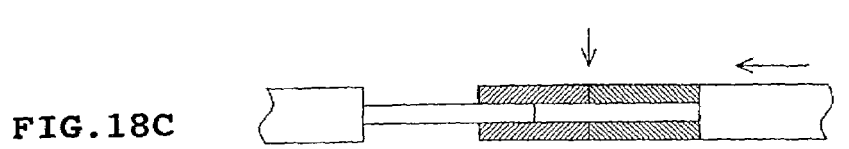

The connection of optical fibers was performed in such a manner as illustrated in FIGS. 18A to 18C. More specifically, coatings of optical fiber 21 and 22 (products of The Furukawa Electric Co., Ltd.; diameter: 250 μm) were removed by 20 mm from their ends to expose a cladding (diameter: 125 μm) of each optical fiber. The claddings and cores of the optical fibers were cut at a portion 5 mm away from the end to adjust the length of the claddings 23 and 24 to 15 mm. Thereafter, the claddings of the optical fibers were inserted into respective microcapillaries 25 and 26 (products of Nippon Electric Glass Co., Ltd.; outer diameter: 0.25 mm; inner diameter: 0.126 mm; length: 10 mm) formed of boro-silicate glass from one ends thereof, and alignment was performed in such a manner that the end surface of each optical fiber cladding was located in the interior 5 mm away from the other end of the microcapillary. Two microcapillaries, into which the optical fiber had been inserted in such a manner, were provided (FIG. 18A). End surfaces of these microcapillaries 25 and 26 were then brought face to face with each other (FIG. 18B). Thereafter, the cladding 24 of one optical fiber was forcedly pushed until it came into contact with the cladding 23 of the other optical fiber, thereby forming a connection structure of optical fibers according to the present invention (FIG. 18C).

In the thus-obtained connection structure of the optical fibers, the optical fibers were prevented from being damaged because the optical fiber claddings easy to be damaged upon connection of the optical fibers were inserted into the respective microcapillaries, and the connection between the optical fibers was feasible with ease.

Thereafter, a connection loss was measured at the junction point of the optical fibers and found to be at most 0.7 dB. The connection structure was thus sufficiently usable as an optical connection structure.

Example 3

Figure 19A:
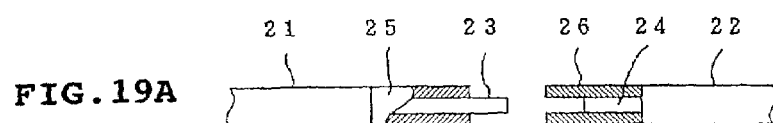
FIGS. 19A and 19B are flow charts illustrating a process for connecting optical fibers according to Example 3.
Figure 19B:
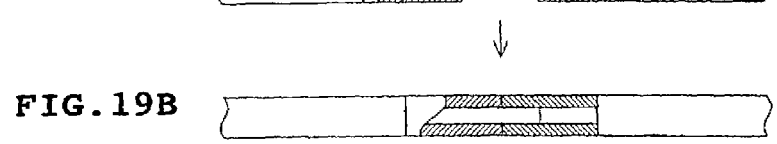

The connection of optical fibers was performed in such a manner as illustrated in FIGS. 19A and 19B. More specifically, coatings of optical fiber 21 and 22 (products of The Furukawa Electric Co., Ltd.; diameter: 250 μm) were removed by 20 mm from their ends to expose a cladding (diameter: 125 μm) of each optical fiber. The cladding and core of one optical fiber were cut at a portion 5 mm away from the end to adjust the length of the cladding 23 to 15 mm. On the other hand, the cladding of the other optical fiber was cut at a portion 15 mm away from the end to adjust the length of the cladding 24 to 5 mm. Thereafter, 2 microcapillaries 25 and 26 (products of Nippon Electric Glass Co., Ltd.; outer diameter: 0.25 mm; inner diameter: 0.126 mm; length: 10 mm) formed of boro-silicate glass were provided, and the cladding 23 of the optical fiber was inserted into one microcapillary 25 from one end thereof and drawn out of the other end by 5 mm. On the other hand, the cladding 24 of the optical fiber was inserted into the other microcapillary 26 in a state retained by 5 mm within the microcapillary (FIG. 19A). End surfaces of these microcapillaries 25 and 26 were then brought face to face with each other, thereby forming a connection structure of optical fibers according to the present invention (FIG. 19B).

In the thus-obtained connection structure of the optical fibers, the optical fibers were prevented from being damaged because the optical fiber claddings easy to be damaged upon connection of the optical fibers were inserted into the respective microcapillaries, and the connection between the optical fibers was feasible with ease.

Thereafter, a connection loss was measured at the junction point of the optical fibers and found to be at most 0.7 dB. The connection structure was thus sufficiently usable as an optical connection structure.

Example 4

Figure 20A:
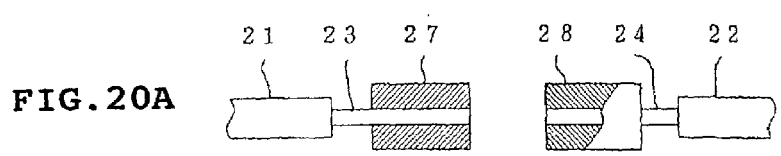
FIGS. 20A to 20C are flow charts illustrating a process for connecting optical fibers according to Example 4.
Figure 20B:
Figure 20C:
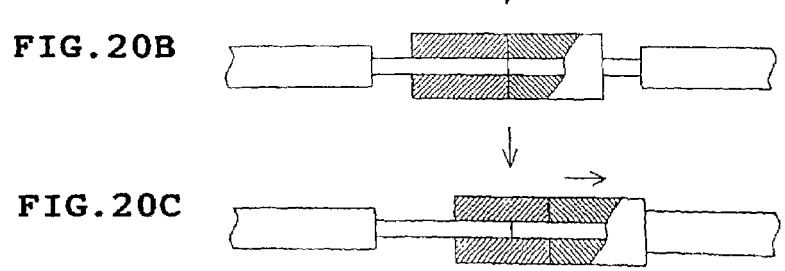

The connection of optical fibers was performed in such a manner as illustrated in FIGS. 20A to 20C. More specifically, coatings of optical fiber 21 and 22 (products of The Furukawa Electric Co., Ltd.; diameter: 250 μm) were removed by 20 mm from their ends to expose a cladding (diameter: 125 μm) of each optical fiber. The claddings and cores of the optical fibers were cut at a portion 5 mm away from the end to adjust the length of the claddings 23 and 24 to 15 mm. Thereafter, the claddings of the optical fibers were inserted into respective metallic capillaries (outer diameter: 0.9 mm; inner diameter: 0.126 mm; length: 10 mm) formed of stainless steel from one ends thereof, and alignment was performed in such a manner that the end surface of each optical fiber cladding was located in the vicinity of the other end of the metallic capillary. Two metallic capillaries, into which the optical fiber had been inserted in such a manner, were provided (FIG. 20A). End surfaces of these metallic capillaries 27 and 28 were then brought face to face with each other (FIG. 20B), and one metallic capillary 27 was slid in the right direction along the center axis of the optical fiber until the other metallic capillary 28 came into contact with the coating of the optical fiber 22, thereby forming a connection structure of optical fibers according to the present invention (FIG. 20C).

In the thus-obtained connection structure of the optical fibers, the optical fibers were prevented from being damaged because the optical fiber claddings easy to be damaged upon connection of the optical fibers were inserted into the respective metallic capillaries, and the connection between the optical fibers was feasible with ease.

Thereafter, a connection loss was measured at the junction point of the optical fibers and found to be at most 0.7 dB. The connection structure was thus sufficiently usable as an optical connection structure.

Example 5

Figure 21A:
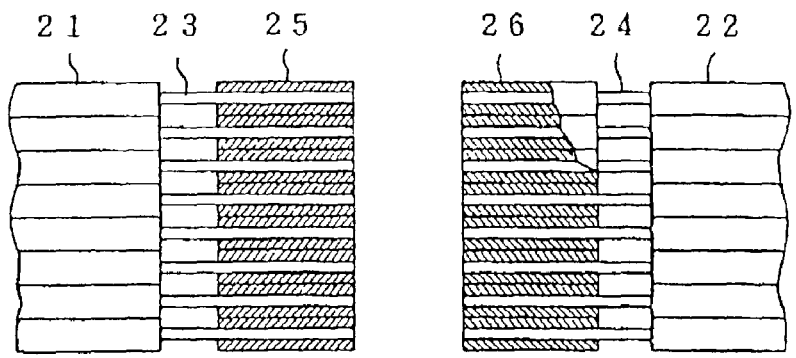
FIGS. 21A to 21C are flow charts illustrating a process for connecting optical fibers according to Example 5.
Figure 21B:
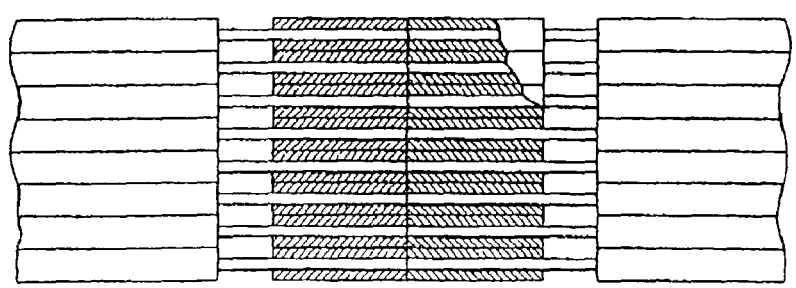
Figure 21C:
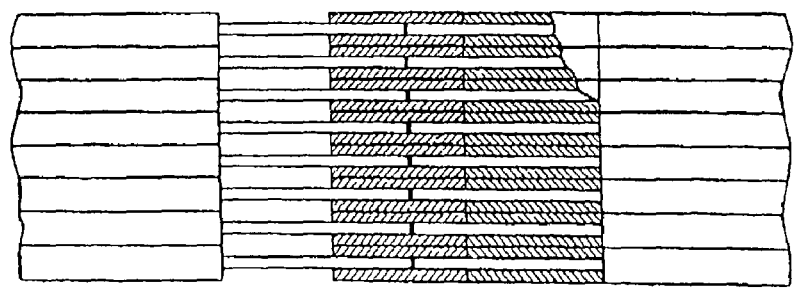

Sixteen microcapillaries, into which the optical fiber had been inserted, were produced in the same manner as in Example 1. As illustrated in FIG. 21A, every 8 microcapillaries were aligned without a space, and a pair of these microcapillaries were faced each other. One opposing 8 microcapillaries were slid as illustrated in FIG. 21B, thereby forming a connection structure of the optical fibers as shown in FIG. 21C. These connection structure units were integrally bonded with an epoxy adhesive (EP-007, product of Cemedine Co., Ltd.) to form a connection structure of multi-optical fibers.

In the thus-obtained connection structure of the optical fibers, even when 8 cores of the optical fibers were collectively connected, the optical fibers were prevented from being damaged because the optical fiber claddings easy to be damaged upon connection of the optical fibers were inserted into the respective microcapillaries, and the connection of all the 8 optical fibers to the other 8 optical fibers was feasible with ease.

Thereafter, a connection loss was measured at the junction point of the optical fibers and found to be at most 0.7 dB. The connection structure was thus sufficiently usable as an optical connection structure.

Example 6

Figure 22A:
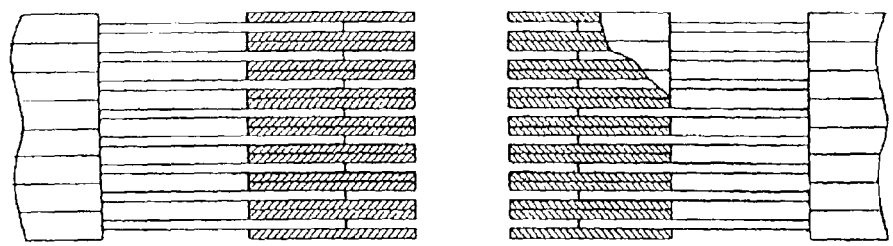
FIGS. 22A to 22C are flow charts illustrating a process for connecting optical fibers according to Example 6.
Figure 22B:
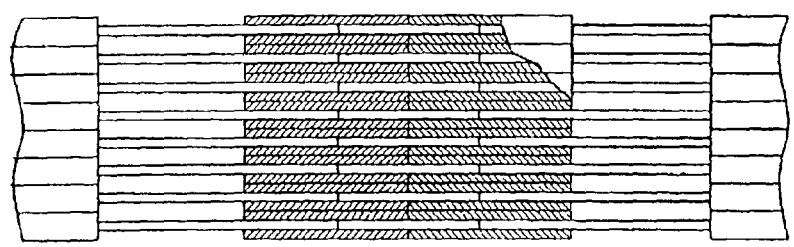
Figure 22C:
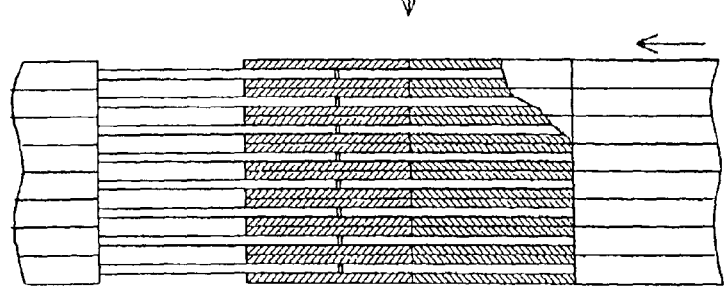

Sixteen microcapillaries, into which the optical fiber had been inserted, were produced in the same manner as in Example 2. As illustrated in FIG. 22A, every 8 microcapillaries were aligned without a space, and a pair of these microcapillaries were faced each other. One optical fibers thus aligned were forcedly pushed as illustrated in FIG. 22B, thereby forming a connection structure of the optical fibers as shown in FIG. 22C. These connection structure units were integrally bonded with an epoxy adhesive (EP-007, product of Cemedine Co., Ltd.) to form a connection structure of multi-optical fibers.

In the thus-obtained connection structure of the optical fibers, even when 8 cores of the optical fibers were collectively connected, the optical fibers were prevented from being damaged because the optical fiber claddings easy to be damaged upon connection of the optical fibers were inserted into the respective microcapillaries, and the connection of all the 8 optical fibers to the other 8 optical fibers was feasible with ease.

Thereafter, a connection loss was measured at the junction point of the optical fibers and found to be at most 0.7 dB. The connection structure was thus sufficiently usable as an optical connection structure.

Example 7

Figure 23A:
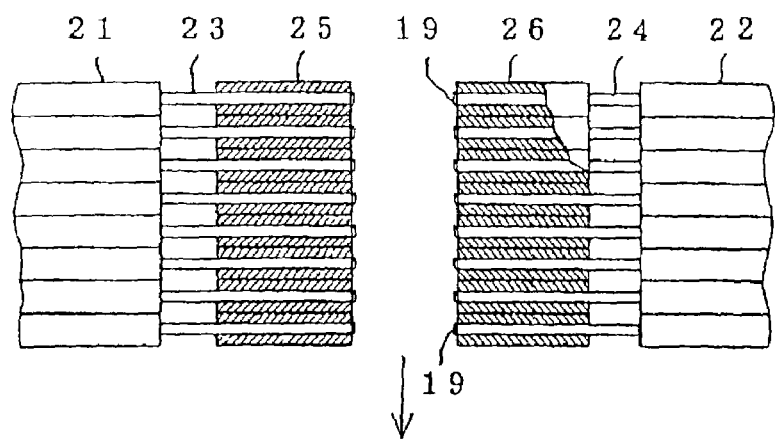
FIGS. 23A to 23C are flow charts illustrating a process for connecting optical fibers according to Example 7.
Figure 23B:
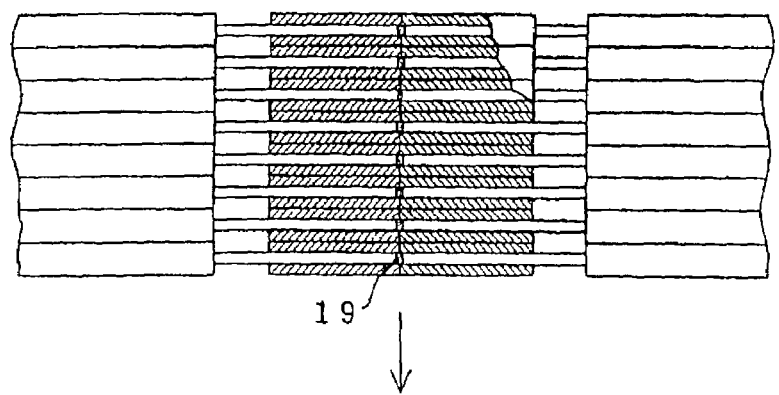
Figure 23C:
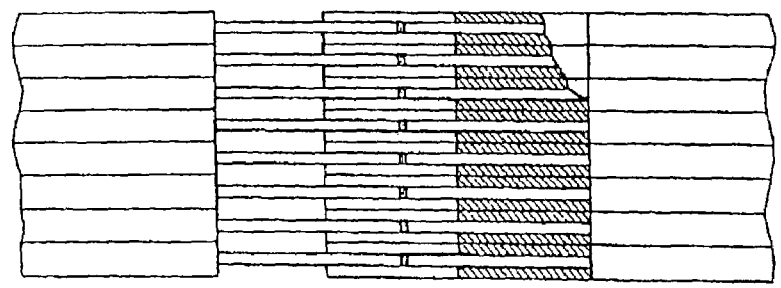

Sixteen microcapillaries, into which the optical fiber had been inserted, were produced in the same manner as in Example 1. As illustrated in FIG. 21A, every 8 microcapillaries were aligned without a space, and a pair of these microcapillaries were faced each other. An index matching agent 19 (Index Matching Agent for V-groove unit for fiber measurement, product of The Furukawa Electric Co., Ltd.) was then applied to ends of the optical fiber claddings, and the respectively opposing microcapillaries were brought face to face with each other as illustrated in FIG. 23B. One opposing 8 microcapillaries were collectively slid in the same manner as in Example 4, thereby forming a connection structure of the optical fibers as shown in FIG. 23C. These connection structure units were integrally bonded with an epoxy adhesive (EP-007, product of Cemedine Co., Ltd.) to form a connection structure of multi-optical fibers.

In the thus-obtained connection structure of the optical fibers, even when 8 optical fibers were collectively connected, the optical fibers were prevented from being damaged because the optical fiber claddings easy to be damaged upon connection of the optical fibers were inserted into the respective microcapillaries, and the connection of all the 8 optical fibers to the other 8 optical fibers was feasible with ease.

Thereafter, a connection loss was measured at the junction point of the optical fibers and found to be at most 0.5 dB. The connection structure was thus sufficiently usable as an optical connection structure.

Example 8

The connection of optical fibers was performed in such a manner as illustrated in FIGS. 24A to 24D. More specifically, coatings of optical fiber 21 and 22 (products of The Furukawa Electric Co., Ltd.; diameter: 250 $\mu$m) were removed by 20 mm from their ends to expose a cladding (diameter: 125 $\mu$m) of each optical fiber. The claddings and cores of the optical fibers were cut at a portion 5 mm away from the end to adjust the length of the claddings 23 and 24 to 15 mm. Thereafter, the claddings of the optical fibers were inserted into a pair of microcapillaries 25 and 26 (products of Nippon Electric Glass Co., Ltd.; outer diameter: 0.25 mm; inner diameter: 0.126 mm; length: 10 mm) formed of boro-silicate glass from one ends thereof, and the end surfaces of the optical fiber claddings were aligned in the vicinity of the other ends of the microcapillaries. A pair of the microcapillaries, into which the optical fiber had been inserted in such a manner, were provided (FIG. 24A). A pair of the microcapillaries 25 and 26 were then aligned with a magnifier on an aligning member 30 (glass sheet, size: 20 mm×10 mm; thickness: 1.5 mm) so as to bring the end surfaces thereof face to face with each other (FIG. 24B). These microcapillaries were held and fixed in the aligned state by a fixing member 40 (glass sheet, size: 20 mm×10 mm; thickness: 1.5 mm) and the aligning member (FIG. 24C). The aligning member and the fixing member were then slid in the right direction along the center axis of the optical fiber until the microcapillary 26 came into contact with the coating of the optical fiber 22, whereby the microcapillaries 25 and 26 were also moved in the right direction to form a connection structure with the claddings 23 and 24 of the optical fibers connected within the microcapillary 25 (FIG. 24D). Incidentally, the aligning member and the fixing member were removed after that.

In the thus-obtained connection structure of the optical fibers, the optical fibers were prevented from being damaged because the optical fiber claddings easy to be damaged upon connection of the optical fibers were inserted into the respective microcapillaries, and the connection between the optical fibers was feasible with ease.

Thereafter, a connection loss was measured at the junction point of the optical fibers and found to be at most 0.7 dB. The connection structure was thus sufficiently usable as an optical connection structure.

Example 9

The connection of optical fibers was performed in such a manner as illustrated in FIGS. 25A to 25C. More specifically, coatings of optical fiber 21 and 22 (products of The Furukawa Electric Co., Ltd.; diameter: 250 μm) were removed by 20 mm from their ends to expose a cladding (diameter: 125 μm) of each optical fiber. The claddings and cores of the optical fibers were cut at a portion 5 mm away from the end to adjust the length of the claddings 23 and 24 to 15 mm. Thereafter, the claddings of the optical fibers were inserted into respective microcapillaries 25 and 26 (products of Nippon Electric Glass Co., Ltd.; outer diameter: 0.25 mm; inner diameter: 0.126 mm; length: 10 mm) formed of boro-silicate glass from one ends thereof, and alignment was performed in such a manner that the end surface of each optical fiber cladding was located in the interior 5 mm away from the other end of the microcapillary. A pair of microcapillaries, into which the optical fiber had been inserted in such a manner, were provided (FIG. 25A). A pair of the microcapillaries 25 and 26 were then aligned with a magnifier on an aligning member 30 (glass sheet, size: 20 mm×10 mm; thickness: 1.5 mm) so as to bring the end surfaces thereof face to face with each other (FIG. 25B). These microcapillaries were held and fixed in the aligned state by a fixing member 40 (glass sheet, size: 20 mm×10 mm; thickness: 1.5 mm) and the aligning member (FIG. 25C). Thereafter, the cladding 24 of one optical fiber was forcedly pushed until it came into contact with the cladding 23 of the other optical fiber, thereby forming a connection structure of optical fibers according to the present invention. Incidentally, the aligning member and the fixing member were removed after that.

In the thus-obtained connection structure of the optical fibers, the optical fibers were prevented from being damaged because the optical fiber claddings easy to be damaged upon connection of the optical fibers were inserted into the respective microcapillaries, and the connection between the optical fibers was feasible with ease.

Thereafter, a connection loss was measured at the junction point of the optical fibers and found to be at most 0.7 dB. The connection structure was thus sufficiently usable as an optical connection structure.

Example 10

The connection of optical fibers was performed in the same manner as in Example 8 except that a fiber holder (E310-1L, manufactured by Suruga Seiki Co., Ltd.; for 250-μm diameter) was used in place of the glass sheet in Example 8. In this case, the connecting members 25 and 26 were placed and brought face to face with each other on the fiber holder in such a manner that end surfaces thereof face each other. FIG. 26 is a cross-sectional view illustrating a state that the connecting members 25 and 26 have been held and fixed by the aligning member 32 and the fixing member 40.

In the thus-obtained connection structure of the optical fibers, the optical fibers were prevented from being damaged because the optical fiber claddings easy to be damaged upon connection of the optical fibers were inserted into the respective microcapillaries, and the connection between the optical fibers was feasible with ease.

Thereafter, a connection loss was measured at the junction point of the optical fibers and found to be at most 0.7 dB. The connection structure was thus sufficiently usable as an optical connection structure.

Example 11

Figure 28:
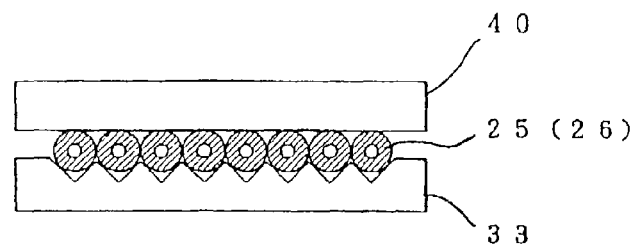
FIG. 28 is a cross-sectional view illustrating a state that connecting members have been fixed in Example 11.

Sixteen microcapillaries, into which the optical fiber had been inserted, were produced in the same manner as in Example 8 (FIG. 27A). These microcapillaries were placed in respective grooves of an aligning member 33 (8-V-grooves Block, manufactured by MORITEX CORPORATION; 250 μm pitch) having 8 grooves having a V-shaped cross-section and brought face to face with each other in such a manner that end surfaces thereof face each other (FIG. 27B). These microcapillaries were held and fixed in the aligned state by a fixing member 40 (glass sheet, size: 20 mm×10 mm; thickness: 1.5 mm) and the aligning member 33. The sectional form thereof is shown in FIG. 28. The aligning member and the fixing member were then slid in the right direction along the center axis of the optical fiber until the microcapillaries 26 came into contact with the respective coatings of the optical fibers 22, whereby the 18 microcapillaries 25 and 26 were also moved in the right direction to form 8 pairs of connection structures with each of claddings 23 and 24 of the optical fibers connected within the microcapillary 25 (FIG. 27C). The aligning member and the fixing member were then removed, thereby collectively producing 8 pairs of connection structures.

In the thus-obtained connection structures of the optical fibers, even when 8 optical fibers were collectively connected, the optical fibers were prevented from being damaged because the optical fiber claddings easy to be damaged upon connection of the optical fibers were inserted into the respective microcapillaries, and the connection of all the 8 optical fibers to the other 8 optical fibers was feasible with ease.

Thereafter, a connection loss was measured at the junction point of the optical fibers and found to be at most 0.7 dB. The connection structure was thus sufficiently usable as an optical connection structure.

Example 12

Figure 29A:
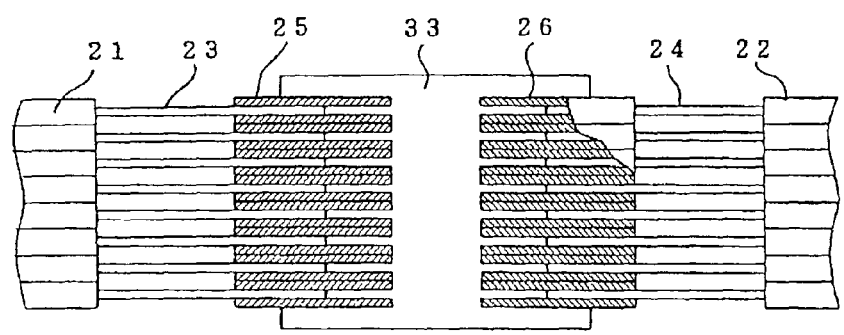
FIGS. 29A to 29C are flow charts illustrating a process for batch-connecting optical fibers according to Example 12.
Figure 29B:
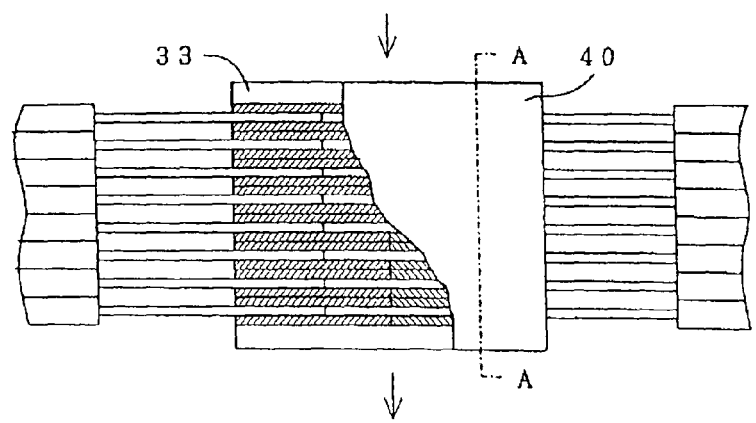
Figure 29C:
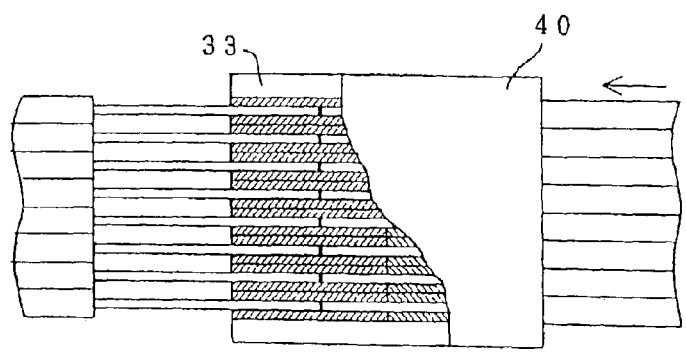

Sixteen microcapillaries, into which the optical fiber had been inserted, were produced in the same manner as in Example 8 (FIG. 29A). These microcapillaries were placed in respective grooves of an aligning member 33 (8-V-grooves Block, manufactured by MORITEX CORPORATION; 250 μm pitch) having 8 grooves having a V-shaped cross-section and brought face to face with each other in such a manner that end surfaces thereof face each other (FIG. 29B). These microcapillaries were held and fixed in the aligned state by a fixing member 40 (glass sheet, size: 20 mm×10 mm; thickness: 1.5 mm) and the aligning member 33 (FIGS. 29B and 30). Thereafter, claddings 24 of one optical fibers were forcedly pushed until they came into contact with the respective claddings 23 of the other optical fibers, thereby forming 8 pairs of connection structures with each of claddings 23 and 24 of the optical fibers connected within the microcapillary 25 (FIG. 29C). The aligning member and the fixing member were then removed, thereby collectively producing 8 pairs of connection structures.

In the thus-obtained connection structures of the optical fibers, even when 8 optical fibers were collectively connected, the optical fibers were prevented from being damaged because the optical fiber claddings easy to be damaged upon connection of the optical fibers were inserted into the respective microcapillaries, and the connection of all the 8 optical fibers to the other 8 optical fibers was feasible with ease.

Thereafter, a connection loss was measured at the junction point of the optical fibers and found to be at most 0.7 dB. The connection structure was thus sufficiently usable as an optical connection structure.

Example 13

The connection of optical fibers was performed in the same manner as in Example 11 except that an index matching agent (Index Matching Agent for V-groove unit for fiber measurement, product of The Furukawa Electric Co., Ltd.) was applied to ends of the optical fiber claddings in Example 11.

In the thus-obtained connection structures of the optical fibers, even when 8 optical fibers were collectively connected, the optical fibers were prevented from being damaged because the optical fiber claddings easy to be damaged upon connection of the optical fibers were inserted into the respective microcapillaries, and the connection of all the 8 optical fibers to the other 8 optical fibers was feasible with ease.

Thereafter, a connection loss was measured at the junction point of the optical fibers and found to be at most 0.5 dB. The connection structure was thus sufficiently usable as an optical connection structure.

Example 14

The connection of optical fibers was performed in such a manner as illustrated in FIGS. 31A to 31C. More specifically, coatings of 16 optical fibers 21a to 21h and 22a to 22h (products of The Furukawa Electric Co., Ltd.; diameter: 250 $\mu$m) were removed by 20 mm from their ends to expose claddings (diameter: 125 $\mu$m) of the optical fibers. The claddings and cores of the optical fibers were cut at a portion 5 mm away from the end to adjust the length of the claddings 23a to 23h and 24a to 24h to 15 mm. Thereafter, the claddings of the optical fibers were inserted into respective connecting blocks 41 and 42 formed of a polyacetal resin and having a width of 7 mm, a length of 10 mm and a height of 3 mm with 8 through-holes having an inner diameter of 126 $\mu$m from one ends thereof, and alignment was performed in such a manner that the end surface of each optical fiber cladding was located in the vicinity of the each other end of the connecting blocks 41 and 42. Two connecting blocks, into which the optical fibers had been inserted in such a manner, were provided (FIG. 31A). Both connecting blocks were then slid in the right direction along the center axis of the optical fiber until the connecting block 42 came into contact with the coatings of the optical fibers 22a to 22h, thereby forming a connection structure of optical fibers according to the present invention (FIG. 31C).

In the thus-obtained connection structure of the optical fibers, the optical fibers were prevented from being damaged because the optical fiber claddings easy to be damaged upon connection of the optical fibers were inserted into the respective metallic capillaries, and the connection between the optical fibers was feasible with ease.

Thereafter, a connection loss was measured at the junction point of the optical fibers and found to be at most 0.7 dB. The connection structure was thus sufficiently usable as an optical connection structure.

What is claimed is:

1. A process for connecting optical fibers, comprising the steps of inserting optical fibers into respective through-holes of a pair of connecting members composed of 2 connecting members each having one through-hole or a plurality of pairs of the connecting members so as to locate an end surface of each optical fiber at an outlet of the through-hole or in the vicinity of the outlet, placing a pair or a plurality of pairs of the connecting members with the optical fibers inserted into the respective through-holes on an aligning member so as to bring the end surfaces of each pair of the 2 connecting members face to face with each other, holding and fixing a pair or a plurality of pairs of the connecting members brought face to face with each other by the aligning member and a fixing member, and then sliding the aligning member and the fixing member in a direction of the center axis of the optical fibers to connect the optical fibers within the through-hole(s) of one connecting member(s).

2. The process for connecting the optical fibers according to claim 1, wherein an index matching agent is applied to end surfaces of the optical fibers to connect the optical fibers.

3. A process for connecting optical fibers, comprising the steps of inserting optical fibers into respective through-holes of a pair of connecting members composed of 2 connecting members each having one through-hole or a plurality of pairs of the connecting members so as to locate an end surface of each optical fiber within the interior of the through-hole, placing a pair or a plurality of pairs of the connecting members with the optical fibers inserted into the respective through-holes on an aligning member so as to bring the end surfaces of each pair of the 2 connecting members face to face with each other, holding and fixing a pair or a plurality of pairs of the connecting members brought face to face with each other by the aligning member and a fixing member, and then forcedly pushing the optical fibers inserted into one or both connecting members to connect the optical fibers within the through-hole(s) of one connecting member(s).

4. The process for connecting the optical fibers according to claim 3, wherein an index matching agent is applied to end surfaces of the optical fibers to connect the optical fibers.

5. The process for connecting the optical fibers according to claim 1 or 3, wherein the aligning member has at least one groove for placing the connecting member.

6. The process for connecting the optical fibers according to claim 5, wherein the groove has a V-shaped cross-section.

7. The process for connecting the optical fibers according to claim 1 or 3, wherein the fixing member is a flat plate.

* * * * *